(12) United States Patent
McBounds

(10) Patent No.: US 11,240,993 B2
(45) Date of Patent: Feb. 8, 2022

(54) ARRANGEMENT AND METHOD FOR ATTACHING A GRIP TO A LEASH END LOOP

(71) Applicant: Derrick McBounds, Detroit, MI (US)

(72) Inventor: Derrick McBounds, Detroit, MI (US)

( * ) Notice: Subject to any disclaimer, the term of this patent is extended or adjusted under 35 U.S.C. 154(b) by 207 days.

(21) Appl. No.: 16/717,424

(22) Filed: Dec. 17, 2019

(65) Prior Publication Data

US 2020/0187459 A1 Jun. 18, 2020

Related U.S. Application Data

(60) Provisional application No. 62/780,514, filed on Dec. 17, 2018.

(51) Int. Cl.
*A01K 27/00* (2006.01)
*F21V 33/00* (2006.01)
*F21Y 115/10* (2016.01)

(52) U.S. Cl.
CPC .......... *A01K 27/003* (2013.01); *A01K 27/006* (2013.01); *F21V 33/0004* (2013.01); *F21Y 2115/10* (2016.08)

(58) Field of Classification Search
CPC .. A01K 27/003; A01K 27/004; A01K 27/006; A01K 27/008; A01K 27/009; A45F 5/1026; A45F 2005/106; A45F 5/10; A45F 2005/108; A45F 2005/1086; B65D 2525/289
See application file for complete search history.

(56) References Cited

U.S. PATENT DOCUMENTS

| | | | | |
|---|---|---|---|---|
| 2,821,739 | A * | 2/1958 | Mohs | A45F 5/1046 16/411 |
| 5,732,662 | A * | 3/1998 | Jacobsen | A01K 27/003 119/798 |
| 7,736,284 | B1 * | 6/2010 | Andrews | A63B 21/072 482/108 |
| 2017/0367303 | A1 * | 12/2017 | Bitar | A01K 27/005 |
| 2019/0116762 | A1 * | 4/2019 | Litzsinger | A01K 27/003 |
| 2020/0296933 | A1 * | 9/2020 | Andaloro | A01K 27/003 |

* cited by examiner

*Primary Examiner* — Kristen C Hayes
(74) *Attorney, Agent, or Firm* — John R. Benefiel

(57) ABSTRACT

A hand grip for a leash which is attachable to a strap leash end loop without any moving parts and features a compact air horn and a light at opposite ends of a grip body.

10 Claims, 4 Drawing Sheets

FIG. 3A
FIG. 3B
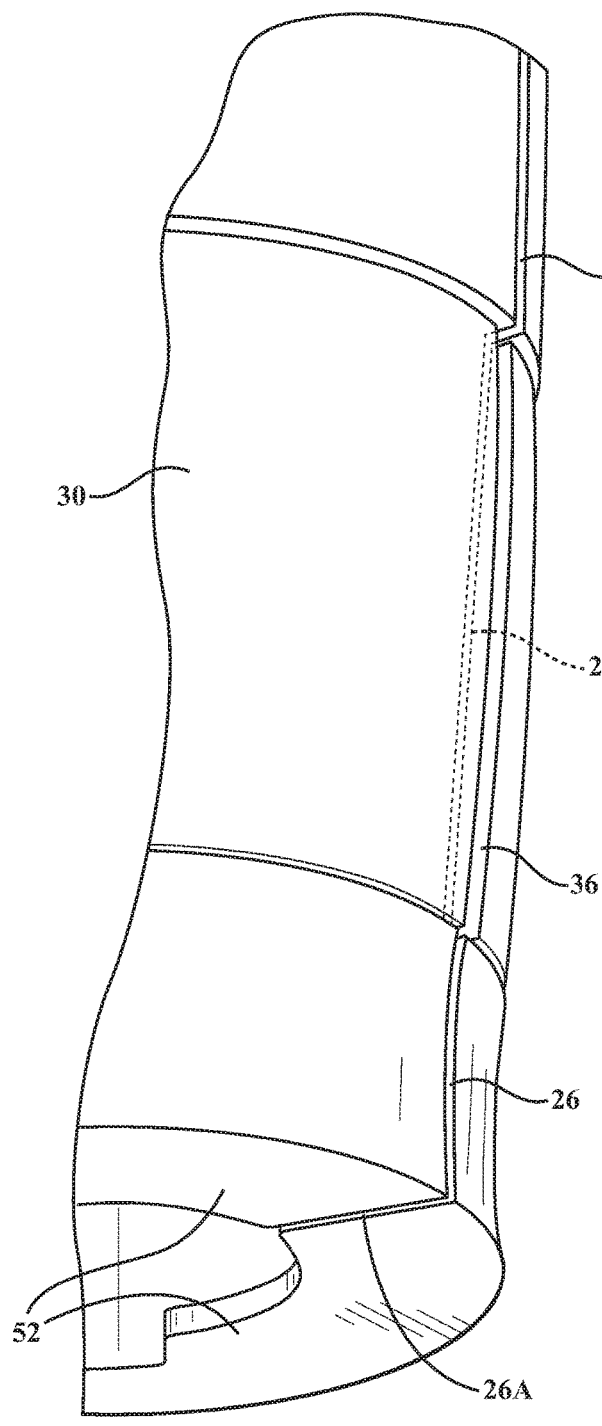
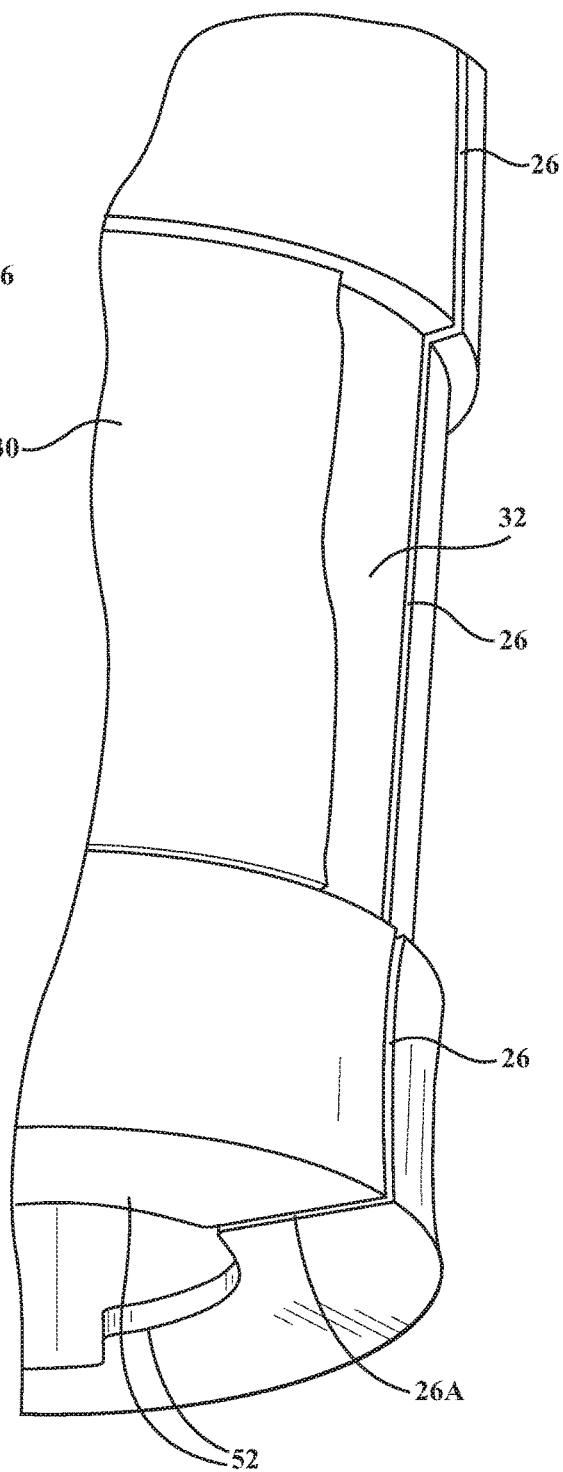

ARRANGEMENT AND METHOD FOR ATTACHING A GRIP TO A LEASH END LOOP

CROSS REFERENCE TO RELATED APPLICATION

This application claims the benefit of U.S. provisional application Ser. No. 62/780,514 filed on Dec. 17, 2018.

BACKGROUND OF THE INVENTION

This invention concerns pet leashes.

Dogs are frequently taken for walks by their owners, and the dog is usually restrained with a leash comprised of a strap attachable to a dog collar at one end and provided with a loop at the other end held by the person taking the dog for a walk. Large dogs in particular can require much effort to be restrained and depending on a simple loop to hold the leash can be tiresome.

It has been proposed to provide a hand grip attachable to the looped end of the leash strap particularly for use with the larger dogs to make it easier to restrain the dog.

While a leash can be sold with a hand grip fixedly attached to the leash by the manufacturer, a dog owner often prefers to be able to attach a hand grip to the loop end of an existing leash. While such leash attachable hand grips have heretofore been proposed, they have involved the use of moving parts and/or also have been relatively complex and bulky.

There have also heretofore been provided dog leash grips which features a light, or an air horn, and it would be advantageous to provide a combination of such features without making the grip too bulky and complicated.

It is an object of the present invention to provide a leash grip which may be readily attached to a leash strap end loop that is compact and does not involve moving parts to attach the grip to an existing leash strap end loop and also is able have a combination of a light and an air horn incorporated in a hand grip which is not bulky and complex while being convenient to use.

SUMMARY OF THE INVENTION

The above object and other objects which will be apparent to those skilled in the art are achieved by a hand grip which incorporates an elongated and generally rounded grip body which is configured to be easily gripped by the fingers of one hand. The grip body has a lengthwise hole extending completely through the grip body from the top to the bottom.

The grip body is also formed with a single lengthwise slit extending radially in from an outer surface of said grip body into said lengthwise extending round hole. The slit can be manually widened sufficiently to allow a central segment of the leash strap to be progressively inserted through the slit when the slit is manually spread and into the round hole within the grip body when the strap is held sideways.

The rest of the loop strap segment can be easily pushed into the round hole with one end of the loop segment exiting the round hole at an open upper end of the grip body and the opposite end of the loop segment passing out of an open lower end of the grip body.

An end loop strap center segment secured in a lengthwise extending position opposite the slit by insertion of a cylindrical member which preferably may be inserted into the through hole at a top end of the grip body and extending most of the way down the round hole. The cylindrical member is sized to cause the slit to be spread slightly and thereby create a snug fit with the loop end center segment in position against the surface defining the round hole.

The diameter of the cylindrical member causes preferably some expansion of the body member enabled by a slight spreading of the slit to create a snug fit when a loop center segment is disposed in said round hole and engaged by the cylindrical member.

An annular recess may be formed into the exterior of the grip body spaced up from a lower end of the grip body, which receives a ring turnable therein and having a lengthwise slot which can be turned to be aligned with the lengthwise slit in the grip body or alternatively to be misaligned to block the grip body slit by turning the ring in the recess in either direction. This allows the loop center segment to pass through the ring slot and then through slit and into the round hole. When the ring is relatively moved to be misalign the grip body slit and the ring slot, the lower end of the center segment of the loop end is blocked from moving out through the slot.

The cylindrical member is advantageously constituted by a cylindrical portion of a compact air horn which is inserted into the round hole. An upper part of the air horn remains positioned above the grip body where it can be actuated by pushing down on the exposed upper part of the air horn.

The end loop strap center segment is thereby held against the wall opposite the slit and resists any shifting of the center loop segment and prevents any chance that the center segment of the loop end will escape out through the slit. The loop end center segment is thereby held in a position away from the grip body slit.

A generally planar bottom piece is mounted to a bottom end of the grip body so as to allow adhesive mounting of a compact LED.

DESCRIPTION OF THE DRAWINGS

FIG. 3A is a further enlarged perspective view of the grip body and turnable ring positioned so that the grip body slit and the ring slot are aligned.

FIG. 3B is a further enlarged view of a portion of the grip body and ring shown in FIG. 2, with the ring partially broken away to expose the grip body slip.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
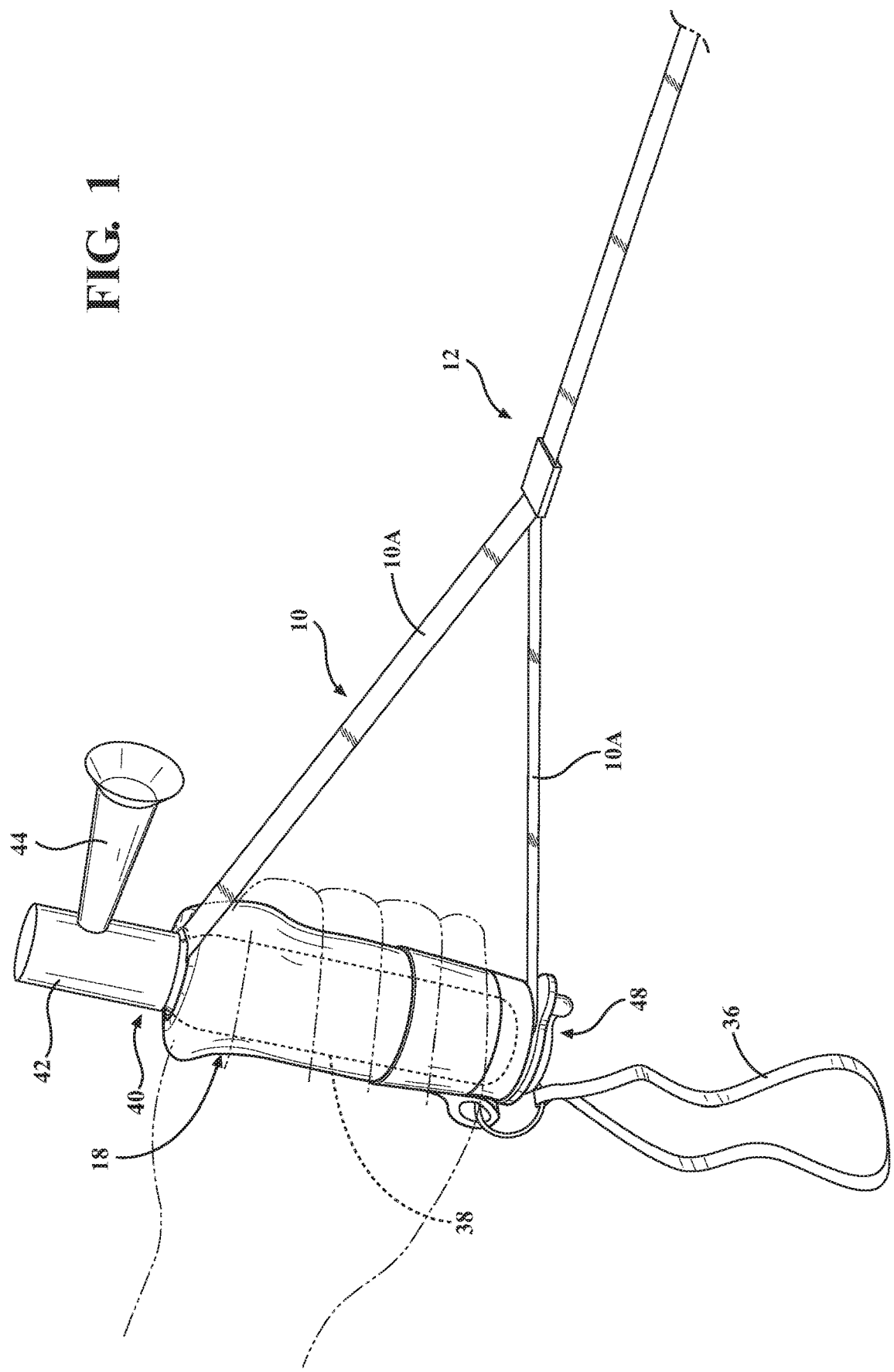
FIG. 1 is a perspective view of a leash loop end attached to a leash grip body according to the present invention.

Referring to FIG. 1, a loop end 10 of a part of a strap leash 12 is shown. The loop end 10 is partially made up of end segments 10A and a center segment 10B.

The leash grip 16 includes a generally tubular grip body 18 of a pair of exposed equal length segments 10A grip body 18 which is shown being grasped by one hand of a user, depicted by broken lines.

Figure 2:
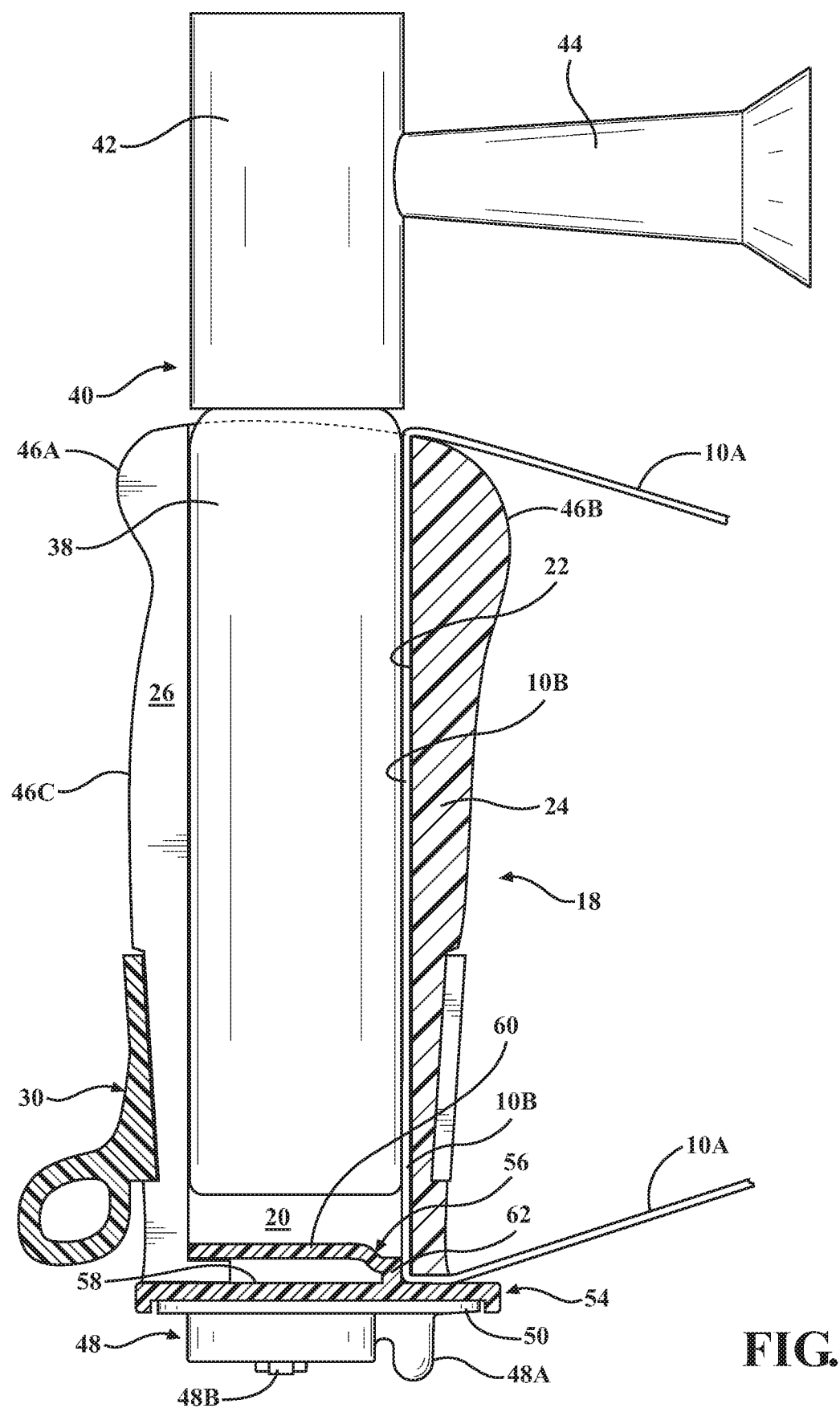
FIG. 2 is an enlarged view of a lengthwise section taken through the leash grip body shown in FIG. 1 with installed components assembled thereto.

The loop end 10 is completed by a center segment 10B extending within a round hole 20 formed in the grip body 18 extending completely through the grip body 18 as seen in FIG. 2.

The center strap segment 10B of the loop end 10 is pressed against the surface 22 of an inner wall 24 formed by the round hole 20 (FIG. 2).

The grip body 18 has a single narrow slit 26 cut as with a laser, or formed therein completely through the wall 24 for its entire length (FIGS. 2, 3, 3A, 3B) which is provided for allowing the center segment 10 to be inserted into the hole 20 as described herein.

A turnable ring 30 is also provided a short distance up from the bottom end of the grip body, which is received in an annular recess 32 formed in grip body 10 formed into the grip body 18.

An integral eye 34 projects out from the ring 30 having a cord loop 36 for conveniently holding items.

The ring 30 itself is formed with a longitudinal slot 36 which may be wider than the slit 26. The ring 30 is turnable to either align the slit 26 with the slot 36 or block the slit 26 by turning the ring 30 to misalign the slit and slot 26.

In order to install the grip body 18 on the loop end 10, the ring 30 is turned to align the slit 26 on the grip body 18 with the slot 36.

The center segment 10B of the loop end strap 10 is turned on edge and forced through the slit 26, while manually spreading open the slit 26 so as to enable the central segment 10B to be progressively passed completely into the round hole 20. The end loop segments 10A should be of equal length and the center segment 10B aligned longitudinally with the grip body 18.

Next, the center segment 10B is positioned against the surface of the grip body 18 wall 22 at a point opposite the slit 26 as seen in FIG. 2.

In order to maintain that positioning, a cylindrical member is inserted into the round hole 22. Advantageously, the cylindrical member is comprised of a lower part 38 of a compact air horn 40.

The diameter of the lower part 38 of the air horn is sufficient to be snugly fit in that position with the central segment 10B present in the round hole 22.

This is achieved by the part 30 being sufficiently large in diameter to cause the wall 24 to be slightly expanded when the cylindrical member (air horn part 38) is inserted.

The lower air horn part 38 extends most of the way down into the round hole 22 as seen in FIG. 2.

This holds the center segment 10B of the end loop 10 in position as far away from the slit 26 as possible to reliably prevent the center segment 10B from escaping out through the slit 26.

The air horn 40 has an upper valve plunger 42 which when depressed allows fluid to be expelled through a trumpet piece 44 which creates a loud piercing sound, in the well known manner. A whistle sound may alternatively be produced by removing the horn.

Such compact air horns are available from LP1 Consumer Products, Inc. of Pompano Beach, Fla.

The grip body 18 is preferably ergonomically shaped having front and rear protuberances 46A, 46B at the top and a mildly convex shape side 46C to make gripping easier.

The leash grip 16 also includes a compact LED light 48 which is mounted to the bottom of the grip body 18 in a manner requiring a flat horizontal surface.

A self-contained compact LED light 48 is mounted to the bottom of the grip body 18.

LED light 48 shown is commercially sold under the trademark Button Lamp, sold by Panther Vision, LLC, 213 W. Main Street, West Dundee, Ill. 60118 and is self contained with built in bulb 48A, switch 48B and batteries (not shown) and may be removed and replaced as a unit when the batteries or bulb wear out, as such lights are inexpensive.

Figure 3:
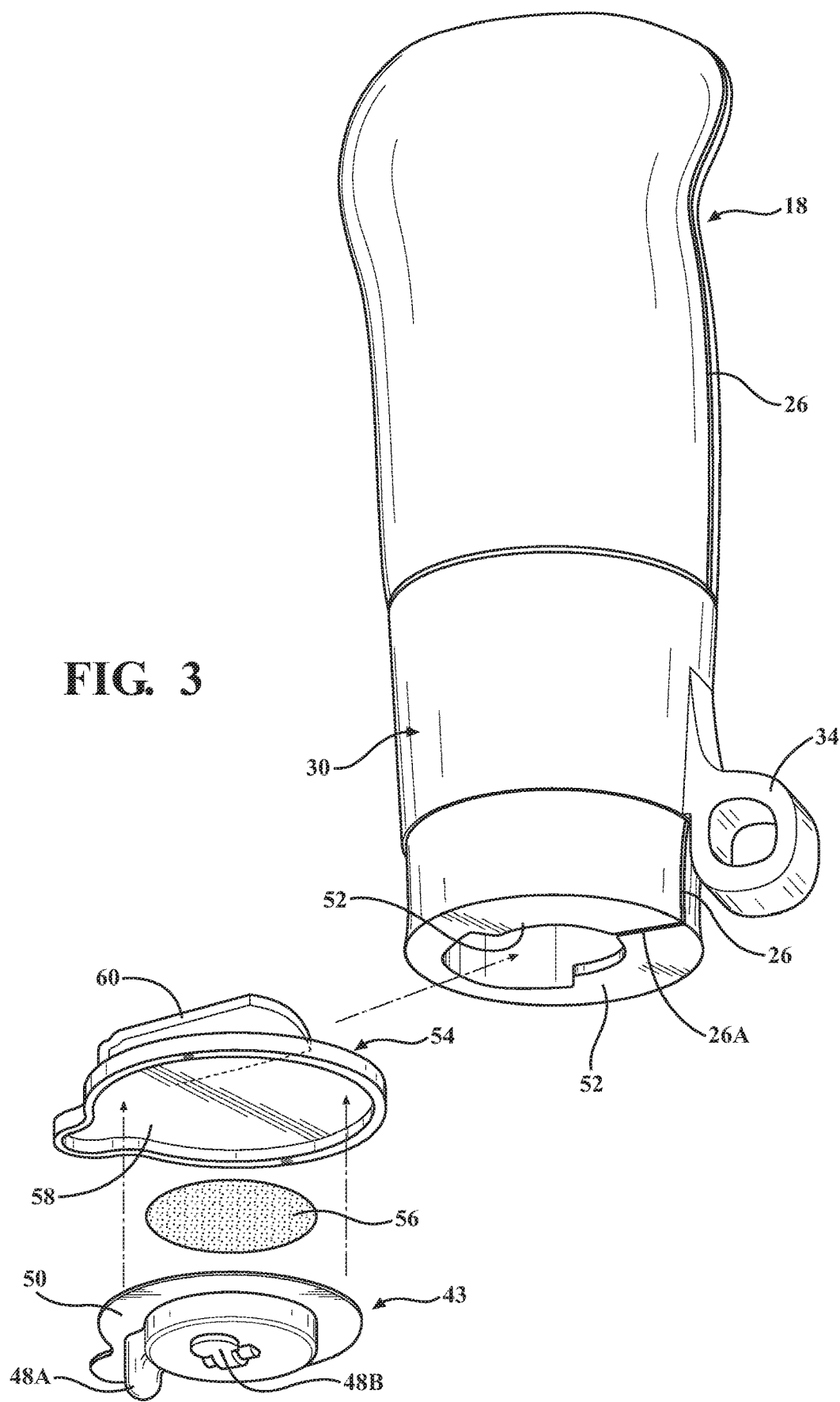
FIG. 3 is an enlarged perspective view from below the grip body of the grip body shown in FIG. 1 with an exploded view of components used to enable mounting of a light at the lower end of the body grip.

The light 48 itself has flat base 50 (FIG. 3).

The grip body 18 lower end is partially open but has radially inward features 52 on a side of the bottom opening where the slit 26 is located. Slit 26 has a portion 26A which extends into the feature 52 to allow passage therethrough of the center segment 10B.

A generally planar cover piece 54 includes a main generally flat portion 58 shaped to receive the light base 50 with an adhesive patch 56 provided.

An integral clip 60 is located on the upper side of the cover piece 54.

The clip 60 is located so as that when the cover piece 54 is tilted up the clip 60 will slide over the features 52 and abut against the inner wall 24 of the grip body 18 (FIG. 2).

The cover piece 54 can be snapped up with shoulder 62 pressed against the lower end of strap center segment 10B as seen in FIG. 2.

The LED light 48 can then be attached to the lower surface of the piece 58 as indicated in FIG. 2.

The plastic parts are preferably molded of a strong plastic such as ABS or similar plastic.

The invention claimed is:

1. A leash grip body configured so as to be able to be gripped by a hand of a user to have a segment of a leash loop end connected thereto at a free end of a leash strap, comprising:

a generally tubular grip body having a round hole extending through the complete length thereof open at a top and bottom ends of said grip body;

said grip body having a single slit extending completely through a wall defined around said round hole and extending along the entire length of said grip body so as to allow a central segment of said leash strap loop to be inserted edgewise through said slit and into said round hole and along the complete length of said body, and a cylindrical member received into said round hole and snugly fit therein when a central segment of said loop end of said leash is positioned in said round hole and disposed against a wall defining said round hole by expansion of said round hole which is enabled by the presence of said slit.

2. The leash grip body according to claim 1 adjacent a lower end of said grip body wherein a ring is fit into said recess to be contained therein which a circumferential recess is formed in said grip body so as to be able to be turned in said recess in either direction; and to be able to be aligned with said lengthwise slit in said grip body or misaligned therewith to block said lengthwise slit by rotation of said ring to cover said slit.

3. The dog leash grip according to claim 1 further including an air horn having a cylindrically shaped flux reservoir comprising said cylindrical member and wherein a tubular portion of an air horn able to be inserted into said interior space of the upper end of said grip body with said dog leash strap loop segment interposed which is thereby pushed against an inside surface of said grip body internal space, said tubular portion sized to be snugly fit therein.

4. The leash grip body according to claim 1 wherein said grip body has a flat cover attached to said bottom end of said grip body and further includes a switch controlled, battery powered LED light attached to and exposed lower surface of said cover.

5. The dog leash grip according to claim 1 wherein an exterior surface of said grip body is enlarged at said upper end of said grip body and shallowly curved outward along a middle region of the length thereof to define an ergonomic shape making griping easier.

6. The dog leash grip body according to claim 1 wherein said ring has an external projecting feature with a loop attached thereto.

7. The dog leash grip body according to claim 4 wherein said light is adhesively attached to an external surface of said end piece so as to be detachable and replaced when one or more batteries powering said LED light become exhausted or a bulb burns out.

8. A method of attaching a grip body able to be gripped by one hand of a user to a segment of a looped end of a leash strap completely forming a round hole in said grip body extending completely through said grip body from a top end and completely through a bottom end thereof;

forming a single slit through a wall formed by said round hole configured to be gripped by one hand of a user and extending longitudinal along the complete length of said grip body to enable expansion of said round hole in order to insert a central segment of said leash strap when held sideways completely through said slit and into said round hole;

positioning said strap segment against an inner surface of said grip body wall from an upper end of said grip body to a lower end of said grip body at a location away from said slit; and inserting a cylindrical member into said round hole sized to create a snug fit therein when holding said strap segment in position against said inner surface of said wall during use of said leash strap.

9. The method according to claim 8 wherein said cylindrical piece comprises inserting a fluid reservoir portion of an air horn, with an air horn discharge portion remaining above said grip body.

10. The method according to claim 8 wherein a lower end of said grip body is covered by mounting a planar cover piece over said lower end and detachably affixing a self-control LED light to the exposed bottom surface of said cover piece.

* * * * *